(12) United States Patent
Herzog

(10) Patent No.: US 11,906,360 B2
(45) Date of Patent: Feb. 20, 2024

(54) GENERATING SPECTRA FROM TRISTIMULUS VALUES

(71) Applicant: GMG GmbH & Co. KG, Tübingen (DE)

(72) Inventor: Patrick Herzog, Emsdetten (DE)

(73) Assignee: GMG GmbH & Co. KG, Tübingen (DE)

( * ) Notice: Subject to any disclaimer, the term of this patent is extended or adjusted under 35 U.S.C. 154(b) by 0 days.

(21) Appl. No.: 17/913,845

(22) PCT Filed: Mar. 25, 2020

(86) PCT No.: PCT/EP2020/058363
§ 371 (c)(1),
(2) Date: Sep. 23, 2022

(87) PCT Pub. No.: WO2021/190743
PCT Pub. Date: Sep. 30, 2021

(65) Prior Publication Data
US 2023/0213387 A1 Jul. 6, 2023

(51) Int. Cl.
*G01J 3/46* (2006.01)

(52) U.S. Cl.
CPC ............... *G01J 3/465* (2013.01); *G01J 3/462* (2013.01)

(58) Field of Classification Search
CPC .... G01J 3/46; G01J 3/463; G01J 3/524; G01J 2003/467; G01J 3/52; G01J 2003/466; G01J 3/465; G01J 3/462

USPC ........................................................ 356/405
See application file for complete search history.

(56) References Cited

U.S. PATENT DOCUMENTS

| 2006/0092444 | A1* | 5/2006 | Nakamura | H04N 1/6033 358/1.9 |
| 2007/0223810 | A1* | 9/2007 | Sekine | H04N 1/60 382/162 |
| 2012/0300230 | A1* | 11/2012 | Dalal | H04N 1/00015 358/1.9 |
| 2019/0240971 | A1* | 8/2019 | Gamm | B41F 33/0036 |

OTHER PUBLICATIONS

Jinxing Liang et al.: Optimized method for spectral reflectance reconstruction from camera responses; Optics Express, vol. 25, No. 23, p. 28273; Nov. 13, 2017.

(Continued)

*Primary Examiner* — Sunghee Y Gray
(74) *Attorney, Agent, or Firm* — Gudrun E. Huckett

(57) ABSTRACT

To bring color, described by Lab values only, back into the spectral domain the invention discloses a method for automatically generating reflectance spectrum values from tristimulus values using a computer system administrating a database with data matrices of reflectance spectra of different colors differentiated by at least the process parameters print technology, substrate and print order of inks, wherein a) given tristimulus values of a color are classified with regard to the process parameters, b) in the database the data matrices of reflectance spectra of the respective color with the most matching process parameters are identified and c) the identified data matrix is used to define the reflectance spectrum values for the respective color.

9 Claims, 13 Drawing Sheets

(56) References Cited

OTHER PUBLICATIONS

En Chen et al.: Spectral reflectance recovery of various materials based on linear interpolation with nonparametric metameric spectra of extreme points; Cryptography, Security and Privacy; ACM, New York; pp. 247-255; Jan. 19, 2019.

Vahid Babaei et al.: Using weighted pseudo-inverse method for reconstruction of reflectance spectra and analyzing the dataset in terms of normality; Color Research & Application; vol. 36, No. 4; pp. 295-305; Aug. 1, 2011.

H. Otsu et al.: Reproducing Spectral Reflectances from Tristimulus Colours: Reproducing Spectral Reflectances from Tristimulus Colours; Computer Graphics Forum: Journal of the European Association for Computer Graphics; vol. 37, No. 6, pp. 370-381; Sep. 1, 2018.

* cited by examiner

GENERATING SPECTRA FROM TRISTIMULUS VALUES

BACKGROUND OF THE INVENTION

When the color of an object (e.g. a printed patch) is measured, the color measurement instrument delivers the result by means of a reflectance spectrum. If one wants to know which color a human person would perceive when looking at the object, the spectrum must be converted into Lab (CIELAB). For that, additional data must be used, namely the spectral power distribution of the used illuminant and the three spectral sensitivity curves of the "observer" looking at the object. In the printing industry, standards require to use the standard illuminant D50 (i.e. natural daylight at a correlated color temperature of approx. 5000K) and the 2° standard observer (CIE1931) to calculate XYZ and Lab values.

There is a well-defined, non-linear relationship between CIEXYZ and CIELAB values, hence both can be lossless converted into each other. Both comprise three components per color and are called tristimulus values. CIELAB values more closely resemble human color vision and are therefore better suited for encoding, while CIEXYZ values are linearly related to the spectral domain. Within the context of this patent application, both are used as synonyms for tristimulus values, unless otherwise noted.

Having in mind that a reflectance spectrum is typically stored with 36 samples (380 through 730 nm in steps of 10 nm), and there are just 3 Lab values, it is obvious that the information amount of tristimulus values is reduced from 36 to 3. The Lab triplet gives the perceived color only for the 2° standard observer under standard illuminant D50, while the original spectrum enables calculating the perceived color under arbitrary illuminants for any observer (provided that the person's spectral sensitivity curves are known).

There are applications, where the spectrum of a color is required, e.g. in order to calculate the tristimulus values for different observers and/or different illuminants, or for usage in physical print models.

The object of the invention is to bring color, described by Lab values only, back into the spectral domain.

SUMMARY OF THE INVENTION

This and other objects are solved by the method according to the invention for automatically generating reflectance spectrum values from tristimulus values using a computer system administrating a database with data matrices of reflectance spectra of different colors differentiated by at least the process parameters print technology, substrate and print order of inks, wherein a) given tristimulus values of a color are classified with regard to the process parameters, b) in the database the data matrix of reflectance spectra of the respective color with the most matching process parameters is identified, and c) the identified data matrix is used to define the reflectance spectrum values for the respective color. Further features are disclosed in the dependent claims.

The plus of information needed to form a reasonable spectral curve from a Lab triplet is taken from additional knowledge of the used print process. E.g. if the Lab values of an IT8.7/3 or ECI2002 chart are available as a text file, it is normally known what type of print process had produced the chart. Different print processes have different characteristics. The parameters influencing the spectral characteristic of a process include:

1) Technology: gravure, offset, flexo, digital, screen
2) Substrate: coated/uncoated paper, plastic film, textile, metallic foil, ceramic
3) Side of the substrate to print on: front or reverse (i.e. on the back side of a transparent substrate)
4) Finishing: laminating, varnishing, etc.
5) Print order of the inks
6) The type of screen/raster and further parameters The invention uses a computer system with a data base to automatically apply a mathematical method to fuse the characteristics of a print process with the given Lab values in order to produce spectral data again.

To understand the procedure, background information is required. In physics and engineering, it is common to transform data sets between different representation domains. E.g. audio data is transformed from the time domain into the frequency domain. This is done by means of a set of sine- and cosine-shaped basis functions of different frequencies. The frequency representation is equivalent to the time representation and can be transformed back into the original domain without loss.

The transform method applicable to tristimulus/spectra data uses basis functions that are derived from the given data set itself instead of using generic basis functions and is called Principal Component Analysis (PCA).

In the following, a given set of spectra that is used to calculate basis vectors by PCA is called "data matrix".

The PCA considers data as sets of N-dimensional vectors. To make the following better understandable, it is assumed that the input data are reflectance spectra, measured from 380 to 730 nm in steps of 10 nm, resulting in 36 data samples per spectrum. Mathematically speaking, each spectrum is a vector in a 36-dimensional vector space.

The invention, however, is applicable to any wavelength range encompassing parts of or entirely the visual range, and to any wavelength sampling interval.

If e.g. a data matrix comprises spectral measurements of 1000 printed color patches.

The first step is to calculate the basis spectra from the data matrix. It is not necessary to describe this step here as it is state of the art. It results in a set of 36 orthonormal basis vectors, which can then be used for transforming the spectra. Because the basis vectors will be different, depending on the data matrix that is used, this step can be called "training the PCA" or "PCA analysis".

Using the basis vectors, now any input spectrum can be transformed into a set of 36 weights of the basis vectors (analysis step), and the 36 weights can be transformed back into the 36-dimensional spectrum (synthesis step) without any loss.

A particular characteristic of the PCA analysis is that the basis vectors are ordered according to their relevance. I.e. the first basis vector is the most relevant one, while the last one is the least relevant one. This enables to reduce the number of basis spectra by omitting the least relevant ones.

It turned out that using only the most relevant half of the basis vectors and throwing away the least relevant 18 ones does not lead to visually noticeable difference. This means that a 36-dimensional spectrum can be transformed into 18 weights and transformed back into a 36-dimensional spectrum with a loss that is small enough not to be visually noticeable.

One could go one step further by reducing the number of basis vectors and weights to 3. While this strong reduction generally leads to some visual degradation, it has the benefit that a direct transform matrix can be set up, which links the basis vector weights with the given tristimulus values XYZ.

FIG. 6 illustrates the method for the two-dimensional case. The data points obviously have a predominant direction, hence the principal vector (i.e. the most relevant basis vector) describes the data already to a good approximation. The second basis vector would be orthogonal to the first one, and its weights would have a much smaller amplitude range.

Hence it can be said that the principal vector, together with the mean vector, provides already a good approximation of the data.

In the following the mathematical background is disclosed and explained:

Let C (3×36) be the color matching functions, weighted by a given illuminant, x be the vector of tristimulus values CIEXYZ, and r be a spectral reflectance with dimension 36×1.

$$x = r * C^T \quad (1)$$

Let B (3×36) be the matrix of the first 3 PCA basis vectors, μ be the mean vector (1×36) of the given data matrix, and p be the vector (1×3) of basis vector weights.

$$p = (r-\mu) * B^T \quad (2)$$

And, since $B^T B = I$ (identity matrix):

$$r = \mu + p * B \quad (3)$$

(3) in (1):

$$x = (\mu + p * B) * C^T$$

or $$p = (x - \mu C^T) * (BC^T)^{-1} \quad (4)$$

(4) in (3):

$$r = \mu + (x - \mu C^T) * (BC^T)^{-1} B \quad (5)$$

Eq. (5) provides a relationship between desired tristimulus values x and a resulting spectrum r. The spectral properties are provided by the data matrix that has been used for the calculation of the PCA basis vectors.

FIG. 7 shows an example of the mean vector and the three principal basis vectors for a certain data matrix of spectra.

In the following, one aspect of application of the invention is described. It has been described above that the number of basis vectors had to be reduced from 36 to 3. The reason was to make the matrix ($BC^T$) invertible. This strong reduction of the amount of basis vectors is quite significant and makes the resulting spectrum a more or less rough approximation of the real spectrum.

Eq. 5 shows that the synthesis is based on a fixed mean vector μ (static part) and a variable component employing the input tristimulus values x and the PCA basis vectors B (dynamic part).

The first extension replaces the mean vector p by a reference spectrum $r_0$, which is being assigned to the given color by using additional information. E.g. if the color mixing recipe of the input color is known, the spectrum of a color mixed in this way can be used as a reference spectrum.

If a spectrally measured color has been created by printing different inks such as CMYK together on a substrate, the device combinations of the printed color, i.e. the fractions of the used inks, are known. The same is true for a given set of tristimulus values. This means that for a given tristimulus color, its device combination can be used to identify the spectrum from a spectral data set (e.g. the data matrix) that has the most suitable spectral characteristic. This spectrum is used as the reference spectrum.

Eq. (5) then becomes $$r = r_0 + (x - r_0 C^T) * (BC^T)^{-1} B \quad (6)$$

On average, the resulting spectrum r is now much closer to the real spectrum of the input color if chosen carefully. This means that the reference spectrum should be taken from the same type of print process as the given input color. E.g. for a printer A of manufacturer B with inks C on paper D, a reference set matching this ABCD combination should be used.

The invention is applicable to any wavelength range encompassing parts of or entirely the visual range, and to any wavelength sampling interval.

FIG. 8 shows the synthesis of a data point plotted in green color. The method on the right hand side represents the native PCA, which makes use of a mean vector. Because there is just one degree of freedom, the approximation is bad, if the green point is off along the second dimension, for which we do not have a basis vector.

The figure on the left represents the reference spectrum method. The reference spectrum can be chosen to hit a neighboring point in the proximity of the green target point. In this case, even with just one degree of freedom, a good approximation can be achieved.

FIG. 9 shows an example of matching an original spectrum by using a reference spectrum and three basis spectra.

In the following, a further aspect of application of the invention is described. Regardless if the native method or the method with reference spectra is used, there is always the risk of synthesizing a spectral reflectance below zero or above 100%. If tristimulus values are calculated from such a spectrum, the results are correct in the sense that they are identical with the ones that had been input into the method. However, even though the results are correct in the mathematical sense, reflectance below zero or above 100% are physically meaningless, and such a spectrum does not exist in reality. Moreover, if such a spectrum is used within a physical print model, values below zero and above 100% need to be clipped to the allowed limit, which in turn leads to wrong tristimulus values.

To overcome these problems, a method has been developed, which clips the out-of-range values to a certain limit iteratively. We describe the method for the zero border, but it is valid for the 100% border as well:
1) A spectrum is synthesized by one of the above methods.
2) The synthesized spectrum is investigated for negative fractions.
3) If everything is positive, do nothing.->finished.
4) If negative parts exist,
   a) Clip all spectral samples that are below a certain threshold t0 to the threshold t0. t0 is small and >0. A typical value for t0 may be 0.02 (i.e. 2%)
   b) Apply a smoothing filter (e.g. a triangular filter) to the entire clipped spectrum, as the clipping may have introduced edges.
   c) Use the clipped spectrum as the reference spectrum and repeat the whole process from step 1.

Setting the threshold to a value>0 allows the iterative method to adjust the shape of the spectrum without underrunning the zero limit immediately. Hence, the method will synthesize a metamerically different spectrum, which exhibits the same tristimulus values.

FIG. 10 shows a spectrum (green) that has been synthesized with negative fractions. The dashed blue line shows the measured spectrum, which is not available in reality, just its Lab values. The yellow line represents an iteratively clipped and corrected spectrum. No smoothing has been applied here, as can be seen at the edge at 590 nm.

FIG. 11 shows another color, whose spectrum has been synthesized with negative fractions (green line). The yellow line has been iteratively clipped and smoothed. It exhibits a much better resemblance of the measured spectrum, which is not known in reality.

What is shown with the zero border, is also applicable with the 100% border, where the threshold is <1, typically at a value of 0.98.

There is an exception, where the 100% limit may be exceeded in a physically correct manner if there are optical brightener agents (OBA) present in the print media, or if the printing ink itself contains OBA. The OBA absorbs light in the low wavelength range (e.g. in the UV) and emits it in a higher wavelength range. The effect is called fluorescence. Typical office papers show an increased reflectance that may exceed 100% in the blue area.

For a print process that uses such a medium, the upper limit may not be a fixed 100%. Instead one may determine an allowed limit, which may be above 100% in the blue, and 100% or even below in the higher wavelength regions. The clipping threshold will then float with the allowed limit in a fixed or wavelength-dependent distance from the limit.

In the following a further aspect of application of the invention is described. Experience shows that undershoots (spectral reflectance below zero) happen much more frequent than overshoots (spectral reflectance above 100%). Reasons may be that colors with strong absorption in parts of or in the entire spectrum may have reflectance values very close to zero. At the upper end, since typical media may reflect only 90% or less, there is much more headroom for shaping the synthesized spectrum, before it exceeds the allowed limit.

Another reason is that a zero reflectance means 100% absorption or, in other word, infinite ink density, which does not exist in nature, the limit cannot be reached or exceeded. This means, that a print process has a strongly non-linear behavior in the proximity of the lower limit, while the PCA is a linear method.

The human eye, on the other hand, has its own non-linearity, which partially compensates the print non-linearity. As a consequence, the eye is much more sensitive to variations by noise, numerical or measurement errors at the dark end than at the bright end.

This leads to a method, where the PCA is applied in a non-linear spectral domain. The non-linearity applied may be similar to that of the human eye (i.e. something close to a cube-root function) but is not limited to that. The method is as follows:

Analysis:
1) Transform the data matrix into the non-linear domain by applying a non-linear transfer function r'=f(r), with f being monotonic with typically f(0)=0 and f(1)=1. However, the 0-0 and 1-1 mapping is not strictly required. These values are given here merely for understanding. Moreover, the non-linearity may also vary with wavelength and the degree of fluorescence.
2) In the non-linear domain, apply the PCA analysis, resulting in a mean vector and a set of 3 basis vectors.

The synthesis is more complex, because the tristimulus values x that are input in eq. (5) in the non-linear domain cannot be directly computed by using the same non-linearity as the spectra, because integrating non-linearly mapped data is different from non-linearly mapping integrated data. However, we can use the mapping for a modified function f_x to generate an estimate of the intended XYZ values x' in the nonlinear domain.

Spectral synthesis:
1) If applicable, map the given reference spectrum: r'_0=f(r_0)
2) Map the input XYZ values: x'=f_x(x), where x' is an estimate of the tristimulus values leading to the correct spectrum.
3) Apply eq. (5) or (6)
4) Map the resulting spectrum back to linear: r=f^-1(r')
5) Calculate tristimulus values x" using eq. (1)
6) Compare the difference d=x"−x with a given limit. If small enough->finished
7) If difference is too big,
   a) modify x, e.g. by x_new=x_old−a*d, where a is a constant.
   b) Repeat from step 2

FIG. 12 shows an example, where a spectrum has been synthesized in the linear domain (green line) including iterative clipping, and in the non-linear domain, where no clipping was required at all. The "non-linear" curve matches the measure one clearly better than the linearly synthesized one.

The described non-linear method may within the scope of the invention be varied in the sense that parts of the processing may be carried out either in the linear or non-linear domain. E.g. the step of subtracting the mean or reference tristimulus values may be done in the linear domain, then a difference spectrum is synthesized and mapped back into the non-linear domain, where the mean or reference vector is added. The non-linearities f and f_x may be modified for that purpose. Eq. (5) becomes:

$$\Delta r' = \Delta x'^{*}(BC^{T})^{-1}B \qquad (7)$$

In the following a further aspect of application of the invention is described. The native PCA method uses one set of spectra (=data matrix) for training the basis vectors/spectra (=analysis). Then, it was extended in the sense that a reference spectrum is picked from the data matrix to replace the static mean vector.

In this extension we do not require the PCA analysis be carried out using the same data set where the reference spectra are taken from. It is even beneficial in some cases to use a different set of spectra for reference and analysis.

Consider a print process that consists only of cyan and orange ink. As the variety of pigments used in the entire process is quite limited, a good representation will be found by three basis spectra. However, if the reference spectra method is used, there may still be some variation along a green-magenta axis required to move the color to the perfect location. The basis spectra however, if based on only cyan and orange, will not exhibit the required green-magenta degree of freedom.

In this case it is better to use a generic data matrix for basis vector generation. The specific properties of the cyan-orange process are then handled by the reference spectra, while the correction shift is done by the generic basis vectors.

In the following a further aspect of application of the invention is described. It was described above that a synthesized spectrum may violate the physical limits of 0% reflection or 100% reflection. It was also described that iterative clipping can be a means to bring back the un-allowed portions into the physically meaningful area. However, synthesizing spectra without the need for iterative manipulation can certainly be considered the better method.

The fact that out of a set of synthesized spectra, one or more of them may have initially been synthesized with portions below zero or above 100%, is an indication of the quality of the synthesis. A well-selected reference spectrum will need only slight shifting, composed of the three basis vectors, and hence the result is very unlikely to exhibit under-/overshoots below 0% or above 100%. If a reference spectrum is farther away from the target Lab values, a considerable shift is required, which can produce these unwanted out-of-bound portions.

A mathematical measure of the synthesis quality can be composed of the zero-undershoots and the 100%-overshoots in different ways. The simplest way may be to just count the number of under/overshoots. A slightly more elaborate way may be to sum up the weighted absolute values of the out-of-bounds amounts.

Considering the fact that a nearly-100% reflectance can only be achieved by hypothetical media or by special tiles, such as are used for calibration of measurement devices, and considering that a typical unprinted media has a maximum reflectance of only roundabout 90% (for a moment ignoring the possible presence of optical brighteners), it is obvious that real prints will rarely come close to the 100% limit. Therefore, setting the upper allowed limit at 100% appears too loose.

A stricter upper limit can be constructed from the spectra of the reference data set and from the actual Lab values of the input data set.

A possible realization may take at each wavelength the maximum reflectance value over the entire spectral data set, resulting in a spectrum $r_{max}$. The fact that the reference media may have different brightness than the input media, may be covered by employing an amplitude scaling of the determined $r_{max}$. Hence, a final upper spectral limit may be calculated as follows:

$$r_{max,lim} = \alpha \cdot r_{max} \cdot Y_{0,in}/Y_{0,ref} + \delta$$

where $r_{max}$ is the per-wavelength determined maximum,
$Y_{0,in}$ is the Y tristimulus value of the input media,
$Y_{0,ref}$ is the Y tristimulus value of the reference media,
$\delta$ is a small constant accounting for numerical or measurement errors.

As this upper limit is calculated from the given data, it also accounts for the possible presence of optical brightening agents (OBA), which may lead to allowed reflectance values above 100% in the blue part of the spectrum, or also in other areas if the inks themselves exhibit fluorescence.

Likewise, the physical 100% limit should be extended for OBA by determining an upper limit from a number of representative reflectance spectra sets.

To conclude, we now have a flat 0% limit, a 100% limit, which may be flat in the OBA-less case but should be extended for OBA in the blue part of the spectrum, and a stricter maximum limit determined from the given data as described above.

From these limits, a simple synthesis quality metric may be:

$$Q_{syn} = a \cdot n_0 + b \cdot n_{100} + c \cdot n_{max}$$

where
$n_0$, $n_{100}$, and $n_{max}$ is the number of colors exceeding the zero, the 100%, and the determined maximum limit, respectively, a, b, and c are weighting factors to account for the different importances of the limits. E.g. a violation of the 100% upper limit may be considered more critical than a violation of the stricter determined maximum limit, so weighting factor c may be made greater than b.

$$Q_{syn} = a \cdot \Delta r_{0,max} + b \cdot \Delta r_{100,max} + c \cdot \Delta r_{max,max}$$

where $\Delta r_{0,max}$, $\Delta r_{100,max}$, and $\Delta r_{max,max}$ is the maximum of the absolute value of the zero, the 100%, and the determined maximum limit exceedance, respectively.

A more elaborate formula may be $$Q_{syn} = \Delta\lambda \cdot (a \cdot \Sigma \Delta r_{0,\lambda} + b \cdot \Sigma \Delta r_{100,\lambda} + c \cdot \Sigma \Delta r_{max,\lambda}),$$

where the sums run over all those absolute values $\Delta r$ that exceed the limit.

Based on one of these metrics, a number of different reference spectra sets can be tested. The one with the lowest value of $Q_{syn}$ may then be used as the reference spectra set.

So far, the invention has been described with application to reflectance spectra. It is, however, likewise applicable to transmission and emission spectra.

The present invention allows several applications which will be very useful in practice.

In the case of a proofing system, the manufacturer of its software may employ considerable effort to ensure it is well-behaved in terms of continuity, monotonicity, smoothness, accuracy, etc. When a new printer model is set up, measurements are taken at thousands of grid points at tight spacing Furthermore, such a gamut is then manually edited, in order to remove outliers, optimize smoothness, or adjust its behavior to that of a certain reference (printer or measurement device). The drawback of this editing is that it can only be done in the Lab domain, hence all spectral data is lost.

With this invention, spectra can be reconstructed again from the Lab values. Here, the original measured spectra are used as reference spectra for one of the above methods.

Printing processes are usually characterized by printing a test chart of thousands of color patches, measuring these patches, and creating a color (ICC) profile from that. As long as just the standard observer and the standard illuminant are used, using CIELAB values for characterization is sufficient.

However, there may be applications, where the physical light source differs from the ideal standard D50, or where the prints shall be reproduced for different light sources, such as D65 or shop light. Moreover, due to higher accuracy demands, it may be required to use a measured spectral power distribution of a physical light source instead of the standard illuminant, e.g. for predicting print results under various illuminants. Moreover, there may be print models used for predicting print processes, or variations of such processes, which require spectral data.

There are huge amounts of CIELAB-only characterization data in the field, and if new applications require spectral data, the methods of the invention may provide the only path back to the spectral domain.

There are fields in the printing business, where not standard CMYK inks are used for printing, but various spot colors. Reasons may be that the quality and color accuracy of brand colors can be better reached, or to extend the color gamut of a printing process.

When such a print document is created by a designer, such colors are typically input "from scratch" by just typing in Lab values, or even RGB values. Hence, no physical realizations exist for these colors. When it comes to printing, a physical realization must be chosen.

Alternatively, a physical print may have been carried out in the past, but because the software applications do not transport spectra, only Lab values exist.

The invention can be used to generate spectra from the given tristimulus values. In most cases, there will be no reference spectrum available, hence, one of the methods based on the mean vector may be used.

It is well-known that different types of color measurement instruments measure differently. Even instruments of the same type produce slightly different results.

On of the methods of the invention may be used to make the spectral data, measured with instrument 1 match those of instrument 2, while keeping the specific spectral characteristics of instrument 1.

The method according to the invention can be realized in a software which automatically uses one or more of the different methods to generate spectra from tristimulus.

BRIEF DESCRIPTION OF THE DRAWING

These and other objects, features, aspects and advantages of the present invention will become more apparent from the following detailed description of preferred embodiments with the accompanying drawings which show

PREFERRED EMBODIMENTS

Figure 1:
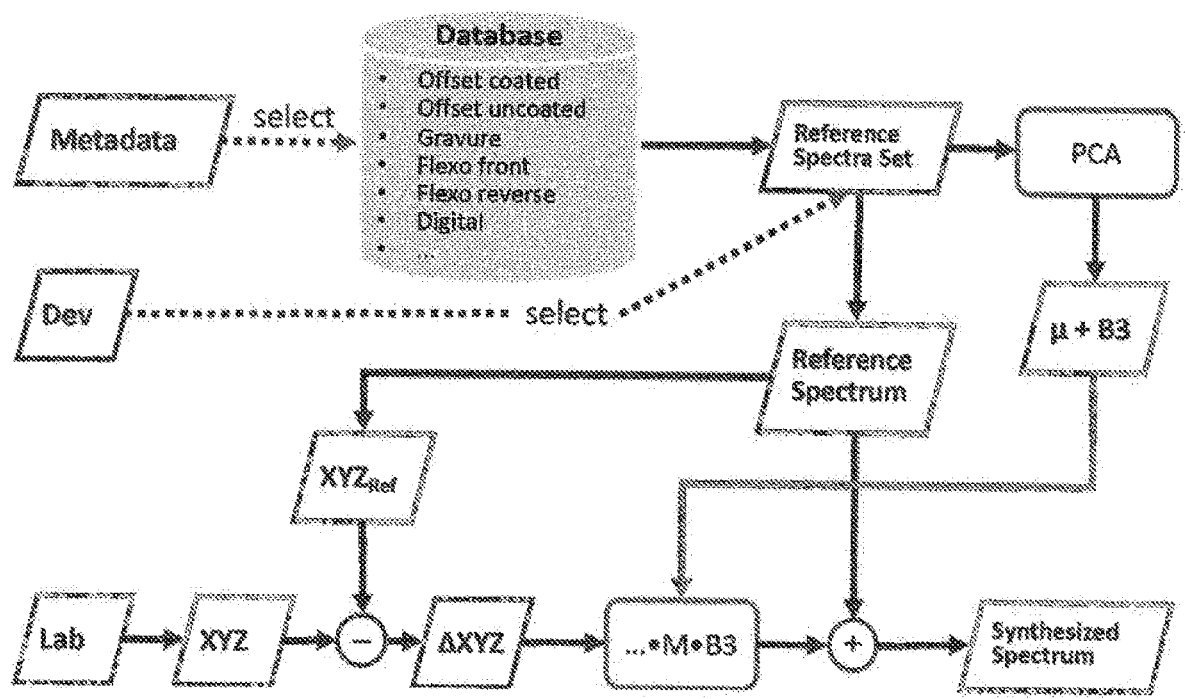
FIG. 1 is a flow chart using a typical computer system in which the present invention may be embodied according to a first aspect.

FIG. 1 shows the use of a reference spectra. The required input is:

A color, described by its Lab values and by the device values (e.g. CMYK) that have been used to print the color, and some metadata describing the type of print process used (e.g. Offset on coated paper). The Lab values are based on a selected illuminant/observer combination (e.g. D50/2°).

Figure 13:
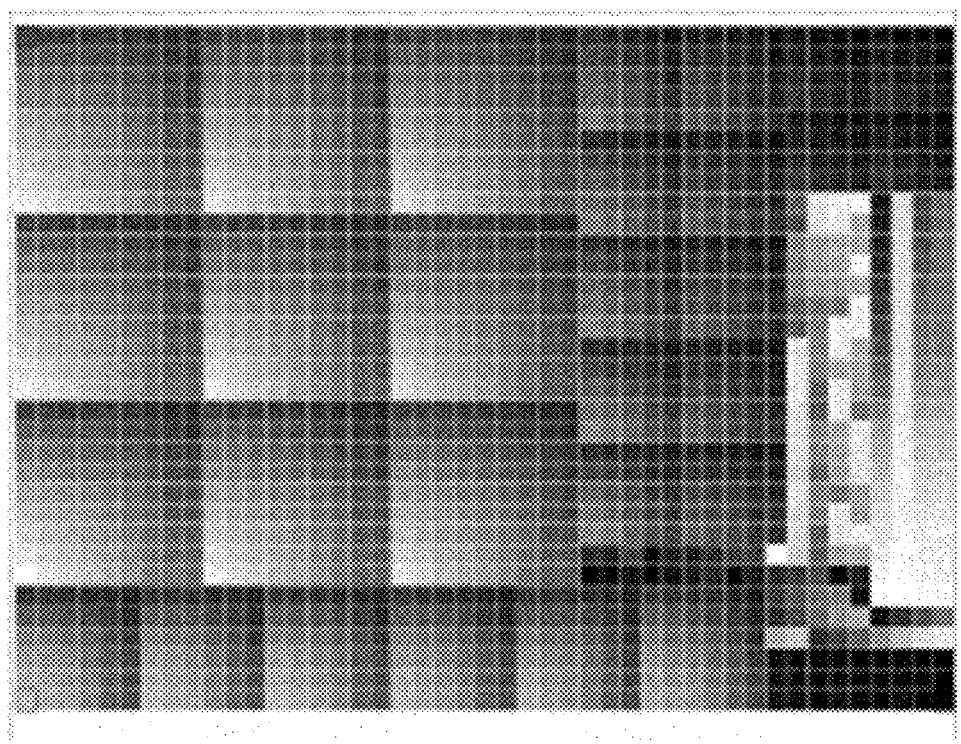
FIG. 13 shows the measured spectra of a printed ECI2002 target.

The process includes:
1. Select a set of reference spectra, based on the given metadata. E.g. for the case of an input color printed by an offset press on coated paper, select a respective reference spectra set. Such a set may be the measured spectra of a printed ECI2002 target (as shown in FIG. 13).
2. Apply the PCA to the entire set of reference spectra, resulting in the mean spectrum $\mu$ and three basis spectra B3 (3×36).
3. Set the mean spectrum $\mu$ to a zero spectrum.
4. Based on the input device combination (e.g. CMYK), select a suitable reference spectrum from the reference spectra set selected before.
5. Convert the reference spectrum to XYZRef.
6. Convert the Lab values to XYZ.
7. Subtract the XYZRef from XYZ, which yields $\Delta$XYZ.
8. Calculate a difference spectrum $\Delta r = \Delta XYZ \cdot M \cdot B3$, where $M = (BCT)-1$ according to equation (6).
9. Add the difference spectrum $\Delta r$ and the reference spectrum, which yields the desired synthesized spectrum.
10. Repeat steps 4-9 for any given input color.

Note that using the given device values for the selection of the reference spectrum is a typical example. Other criteria for the selection may be used as well. Examples are to use the recipe for mixing the pigments of the ink, or selecting the ref. spectrum based on the smallest color difference $\Delta E$ from the input Lab.

Figure 2:
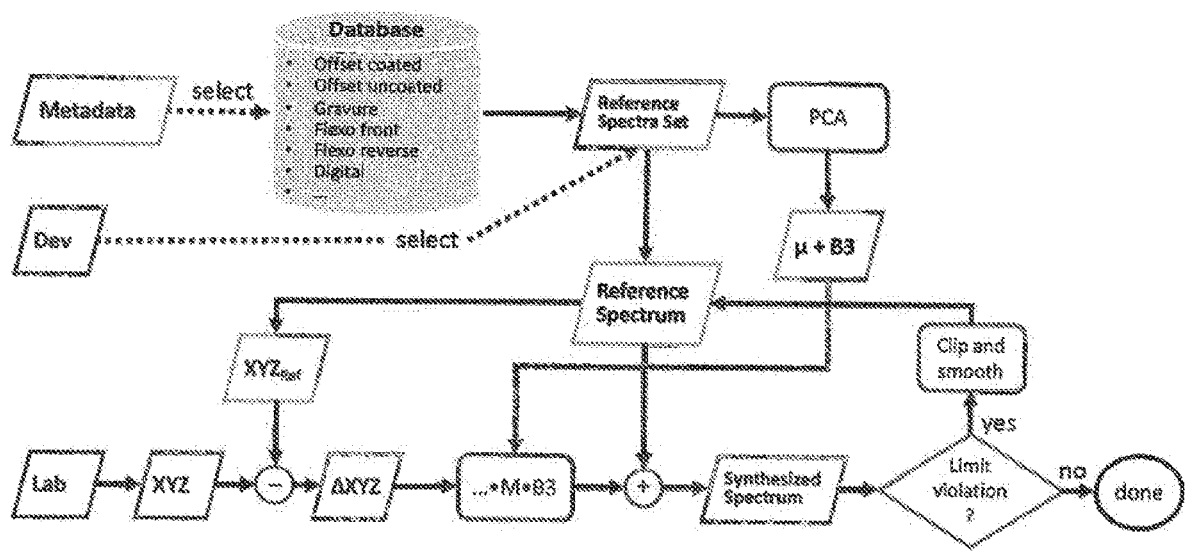
FIG. 2 is a flow chart using a typical computer system in which the present invention may be embodied according to a second aspect.

FIG. 2 shows the use of a method for iterative clipping of negative fractions. The required input identical as describes with regard to FIG. 1. The process includes the steps 1 to 9 as describes with regard to FIG. 1 and the following steps:

10. Check the synthesized spectrum for values below zero or above the (possibly OBA-corrected) 100% limit. If no limit violations occur, use the synthesized spectrum.
11. If at least one of the zero and 100% limits are violated, clip the values of the synthesized spectrum as described and smooth it.
12. Use the clipped spectrum as the new reference spectrum and continue with step 5.
13. Repeat steps 4-12 for any given input color.

Figure 3:
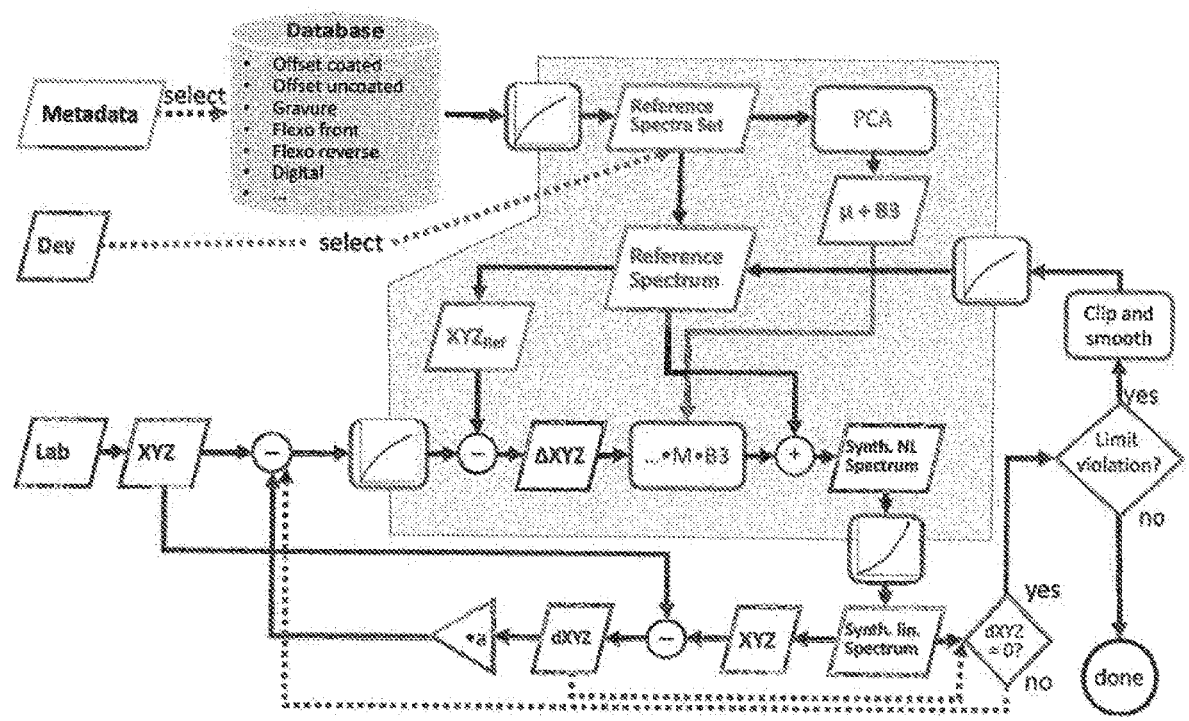
FIG. 3 is a flow chart using a typical computer system in which the present invention may be embodied according to a third aspect.

FIG. 3 shows the use of a method by applying the PCA in a non-linear domain. The required input identical as describes with regard to FIG. 1. The process includes the steps as follows:

1. Select a set of reference spectra, based on the given metadata. E.g. for the case of an input color printed by an offset press on coated paper, select a respective reference spectra set. Such a set may be the measured spectra of a printed ECI2002 target (figure on the right).
2. Transform all spectra of the selected set into the nonlinear domain using a non-linear mapping function (e.g. a root function).
3. Apply the PCA to the entire set of reference spectra, resulting in the mean spectrum $\mu$ and three basis spectra B3 (3×36).
4. Set the mean spectrum $\mu$ to a zero spectrum.
5. Based on the input device combination (e.g. CMYK), select a suitable reference spectrum from the reference spectra set selected before.
6. Convert the reference spectrum to $XYZ_{Ref}$ in the nonlinear domain.
7. Convert the input Lab values to XYZ.
8. Map the XYZ values into the nonlinear domain using the same or a similar mapping function as used for the spectra.
9. Subtract the $XYZ_{Ref}$ from XYZ, which yields $\Delta$XYZ.
10. Calculate a difference spectrum $\Delta r = \Delta XYZ \cdot M \cdot B3$, where $M = (BC^T)^{-1}$ according to equation (6).
11. Add the difference spectrum $\Delta r$ and the reference spectrum, which yields the desired synthesized spectrum in the nonlinear domain.
12. Transform the synthesized spectrum back into the linear domain using an inverse mapping function.

13. Calculate XYZ values from the synthesized linear spectrum and subtract the input XYZ values from it, which yields dXYZ.
14. If the difference dXYZ is greater than a given threshold, multiply it by a constant a and subtract it from the input XYZ values. Continue with step 8.
15. If the difference dXYZ is smaller than the threshold, it can be processed further by checking for violation of the limits.
16. If limits are violated, clipping and smoothing is applied to the synthesized spectrum.
17. The clipped and smoothed spectrum is mapped into the linear domain and used to replace the reference spectrum. Continue with step 9.
18. If no limits are violated, the synthesized spectrum is final.
19. Repeat steps 5-18 for any given input color.

Figure 4:
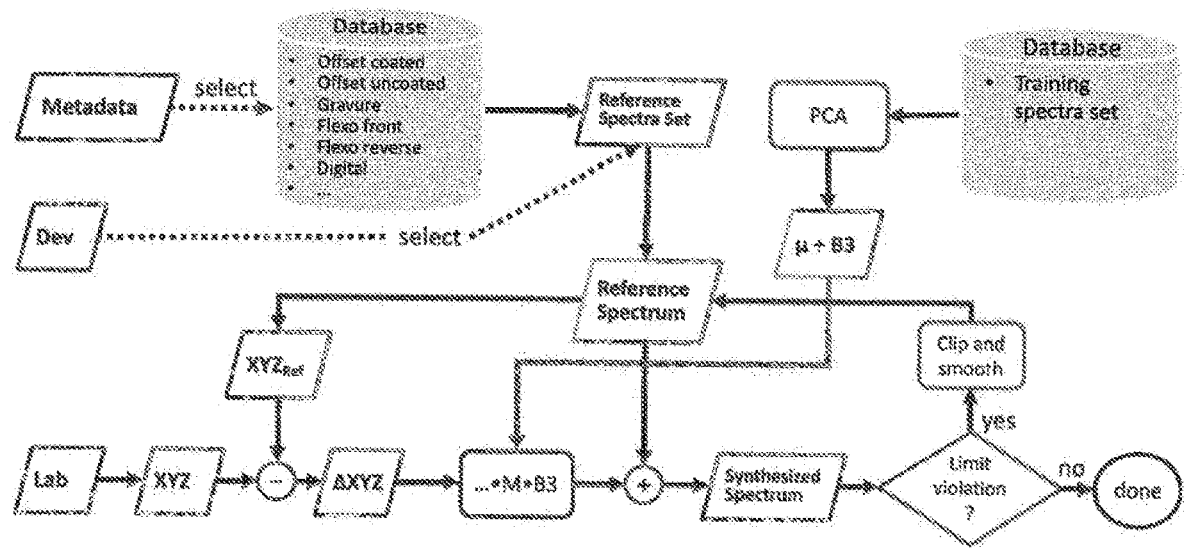
FIG. 4 is a flow chart using a typical computer system in which the present invention may be embodied according to a forth aspect and FIG. 5 is a flow chart using a typical computer system in which the present invention may be embodied according to a fifth aspect.

FIG. 4 shows the use of different sets of spectra for analysis and reference. In this example, the spectral data set used for analysis of the PCA is different from the spectral data set used for selecting the reference spectrum. Other than that, the process steps are identical with the methods described before.

The figure shows how to use a separate data matrix exemplarily for the case checking and correcting for limit violations. However, it can be applied to the other methods as well.

Figure 5:
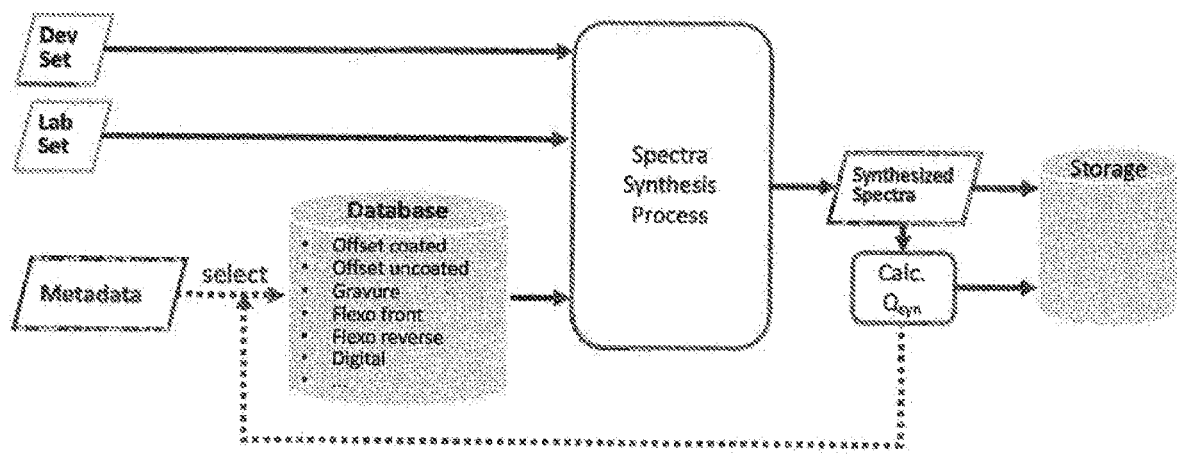
Figure 6:
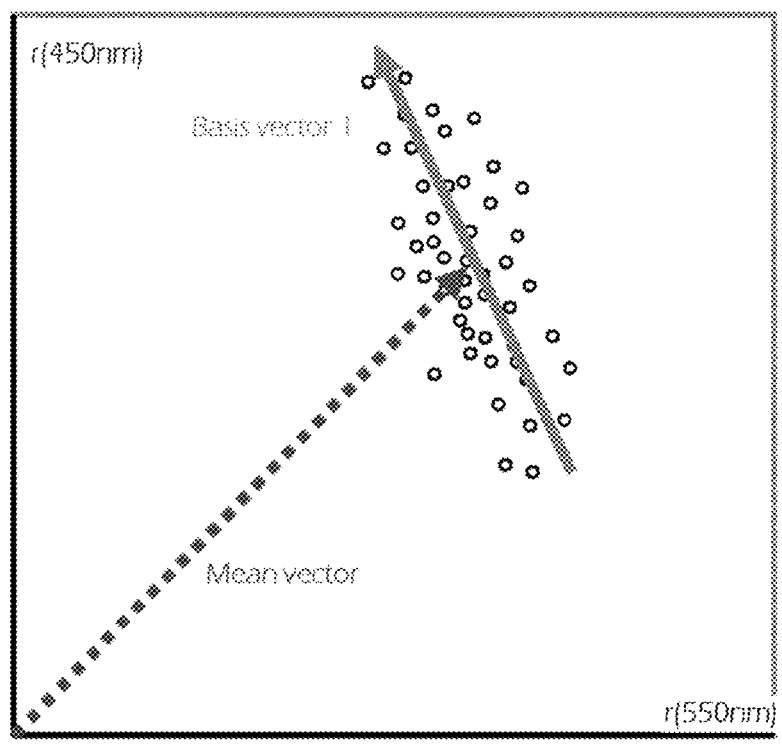
FIG. 6 illustrates the method for the two-dimensional case.
Figure 7:
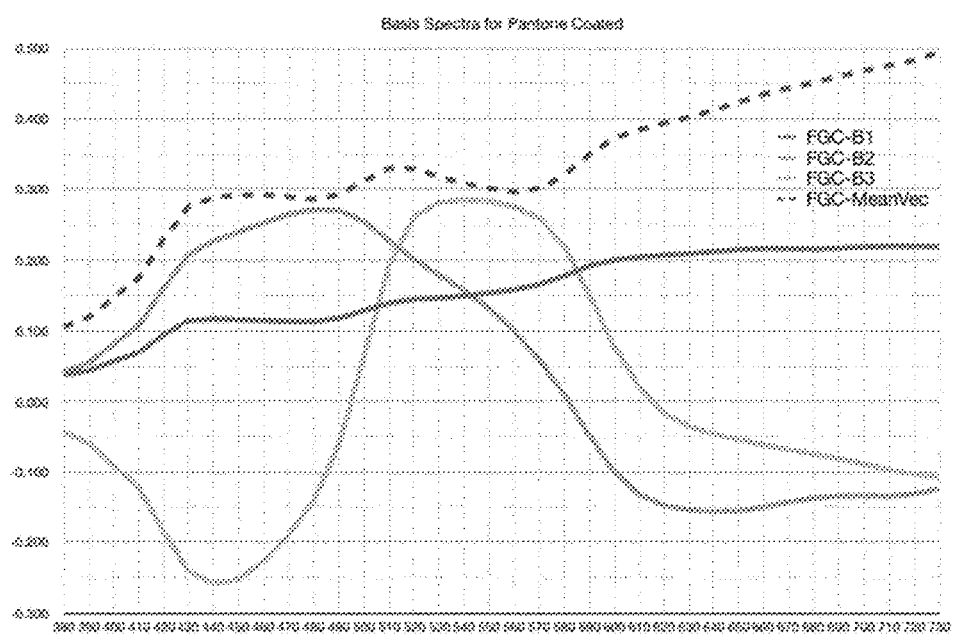
FIG. 7 shows an example of the mean vector and the three principal basis vectors for a certain data matrix of spectra.
Figure 8:
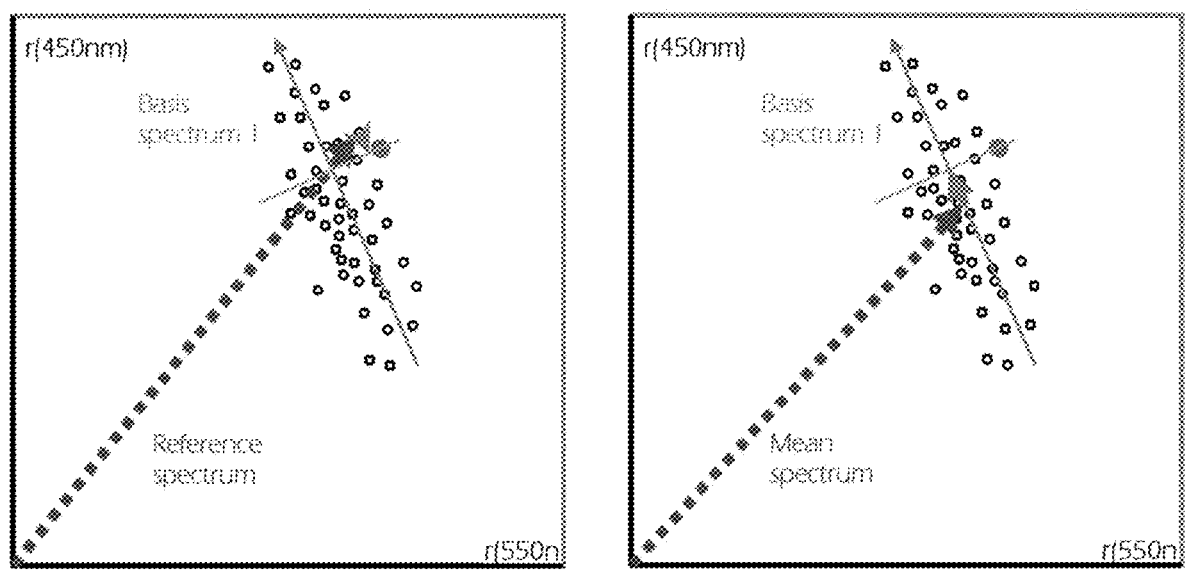
FIG. 8 shows the synthesis of a data point plotted in green color.
Figure 9:
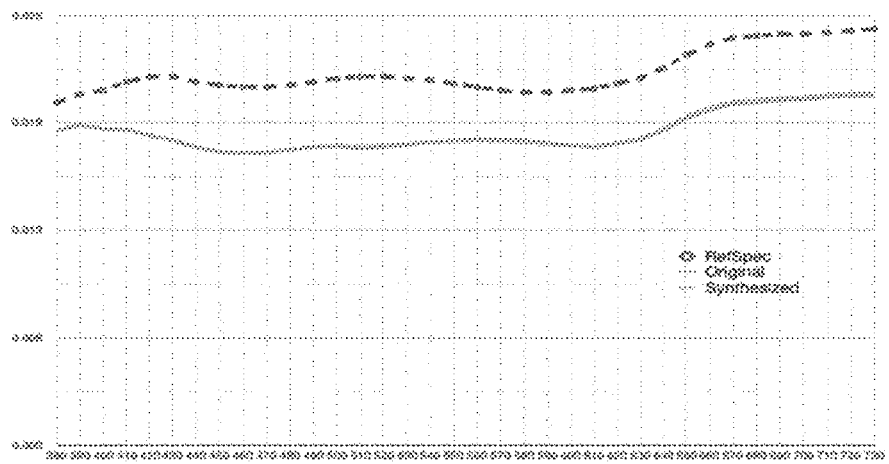
FIG. 9 shows an example of matching an original spectrum by using a reference spectrum and three basis spectra.
Figure 10:
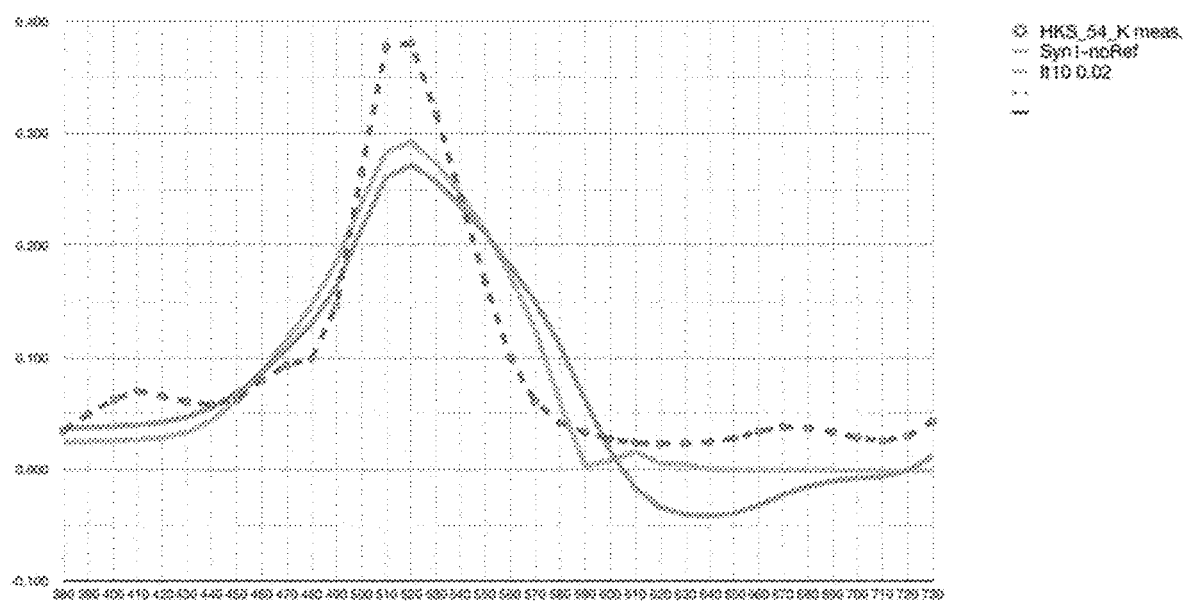
FIG. 10 shows a spectrum (green) that has been synthesized with negative fractions.
Figure 11:
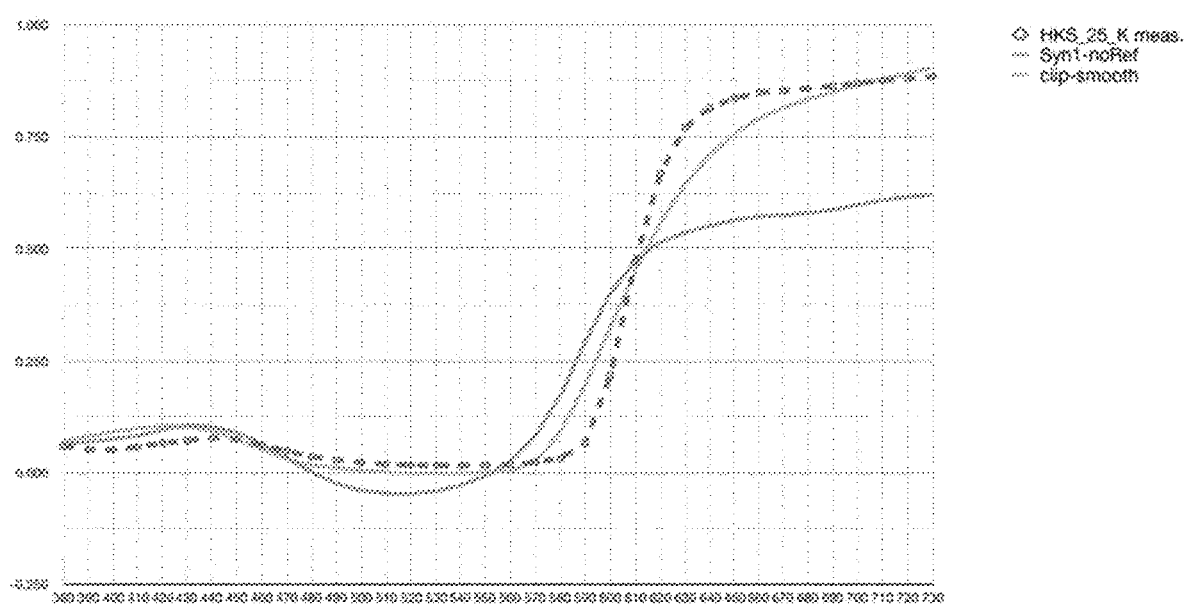
FIG. 11 shows another color whose spectrum has been synthesized with negative fractions (green line).
Figure 12:
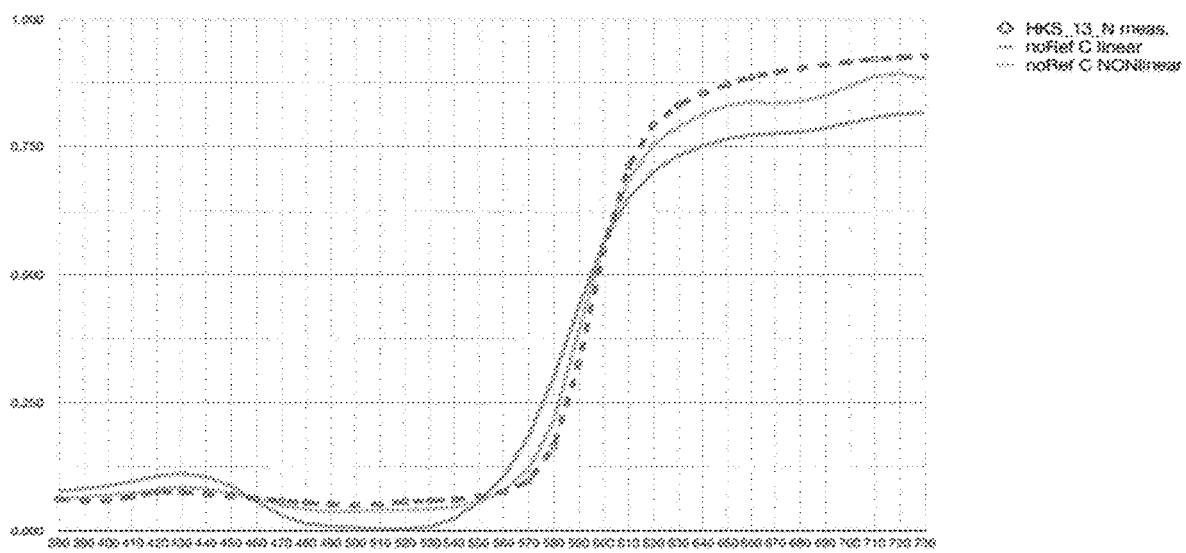
FIG. 12 shows an example, where a spectrum has been synthesized in the linear domain (green line) including iterative clipping, and in the non-linear domain, where no clipping was required at all.

FIG. 5 shows the method of measuring the success of spectral synthesis. The required input is:

A set of colors, described by their Lab values and by the device values (e.g. CMYK) that have been used to print the colors, and some metadata describing the type of print process used (e.g. Offset on coated paper). The Lab values are based on a selected illuminant/observer combination (e.g. D50/2°).

The process includes the steps:
1. Select a set of reference spectra, based on the given metadata. E.g. for the case of an input color printed by an offset press on coated paper, select a respective reference spectra set. Such a set may be the measured spectra of a printed ECI2002 target.
2. Apply one of the methods described above, but excluding any clipping, to synthesize a spectrum.
3. Repeat the synthesis for all of the given input colors, so that an entire set of synthesized spectra is generated.
4. Store the set of synthesized spectra
5. Calculate the quality metric $Q_{syn}$ using one of the described formulae.
6. Store the quality metric associated with the set of synthesized spectra.
7. Select another reference spectra set and repeat steps 2-6.
8. Repeat step 7 N times.
9. From the storage, select the synthesized set of spectra, which has the lowest associated quality metric.

Although this invention has been described with respect to preferred embodiments, those embodiments are illustrative only. No limitation with respect to the preferred embodiments is intended or should be inferred. It will be observed that numerous variations and modifications may be effected without departing from the scope of the invention as defined by the claims appended hereto.

What is claimed is:

1. Method for automatically generating reflectance spectrum values from tristimulus values using a computer system administrating a database with data matrices of reflectance spectra of different colors differentiated by one or more process parameters, wherein the one or more process parameters include print technology, substrate, and print order of inks, the method comprising:
   a) classifying given tristimulus values of a color with regard to the one or more process parameters,
   b) identifying in the database a data matrix of reflectance spectra of said color with matches of the one or more process parameters matching most, and
   c) using the data matrix of reflectance spectra of said color identified in step b) to define the reflectance spectrum values for said color and selecting the one or more process parameters for a print process as needed, based on the reflectance spectrum values for said color;
wherein the data matrix of reflectance spectra of said color identified in step b) is reduced to basis vector data within a PCA (principal component analysis) process to yield correct tristimulus values of the reflectance spectra, based on an equation $$r = \mu + (x - \mu C^T) * (BC^T)^{-1} B$$

wherein r be the spectral reflectance, μ be a mean vector of the data matrix of reflectance spectra of said color identified in step b), x be a vector of tristimulus values, C be a color matching function weighted by a given illuminant, and B be a matrix of the PCA (principal component analysis) basis vectors.

2. Method according to claim 1, further comprising:
   d) using the data matrix of reflectance spectra of said color identified in step b) as a reference spectrum to calculate resulting tristimulus values,
   e) comparing the calculated tristimulus values to the given tristimulus values to define differences,
   f) using the differences to adjust the reference spectrum resulting in a synthesized spectrum.

3. Method according to claim 2, wherein the adjustment of the reference spectrum is based on an equation $$r = r_o + (x - r_o C^T) * (BC^T)^{-1} B$$

wherein r be a spectral reflectance, C be the color matching functions, weighted by a given illuminant, x be the vector of tristimulus values CIEXYZ, B be the matrix of 3 chosen basis vectors, $r_o$ be the reference spectrum.

4. Method according to claim 3, wherein B represents the matrix of the first 3 basis vectors resulting from the PCA (principal component analysis) process with the dimension (3×36).

5. Method according to claim 2, wherein the synthesized spectrum is investigated for negative reflectance and, if negative reflectance exist, further comprising:
   i) clipping all spectral samples that are below a given threshold t to said given threshold t to generate a clipped spectrum,
   ii) applying a smoothing filter to said clipped spectrum, as the clipping may have introduced edges, to generate a smoothed clipped spectrum, and
   iii) using the smoothed clipped spectrum as the reference spectrum.

6. Method according to claim 5, wherein the given threshold t is t>0.

7. Method according to claim 5, further comprising transforming the tristimulus values and the reference spectrum into a non-linear domain by applying a non-linear transfer function r'=f(r), the non-linear transfer function being a root function, and reducing the tristimulus values and the reference spectrum within the PCA (principal component analysis) process to produce revised basis vector data of reflectance spectra.

8. Method according to claim 1, wherein the data base is a database with generic basis vector data of reflectance spectra of different colors, further comprising using a further data base with process related data matrices of reference spectra of different colors so that the specific properties of the process are then taken from the reference spectra, while a correction shift is performed by using the generic basis vectors.

9. Method according to claim 1, further comprising producing a number of different reflectance spectra sets and evaluating a quality of the number of different reflectance spectra sets with regard to a success of the spectral synthesis to decide for a best result.

* * * * *